US012732011B2

(12) United States Patent
Liu et al.

(10) Patent No.: US 12,732,011 B2
(45) Date of Patent: Sep. 8, 2026

(54) CHARGING DEVICE, METHOD FOR CONTROLLING CHARGING OF CHARGING DEVICE, AND VEHICLE

(71) Applicant: BYD COMPANY LIMITED, Shenzhen (CN)

(72) Inventors: Weidong Liu, Shenzhen (CN); Chao Wang, Shenzhen (CN); Xinghui Wang, Shenzhen (CN)

(73) Assignee: BYD COMPANY LIMITED, Shenzhen (CN)

(*) Notice: Subject to any disclaimer, the term of this patent is extended or adjusted under 35 U.S.C. 154(b) by 746 days.

(21) Appl. No.: 18/295,610

(22) Filed: Apr. 4, 2023

(65) Prior Publication Data

US 2023/0261492 A1 Aug. 17, 2023

Related U.S. Application Data

(63) Continuation of application No. PCT/CN2021/117465, filed on Sep. 9, 2021.

(30) Foreign Application Priority Data

Oct. 13, 2020 (CN) ........................ 202011091549.8

(51) Int. Cl.
*H02J 7/00* (2026.01)
*B60L 53/22* (2019.01)
(Continued)

(52) U.S. Cl.
CPC ................ *H02J 7/90* (2026.01); *B60L 53/22* (2019.02); *H02M 1/126* (2013.01); *H02M 1/42* (2013.01);
(Continued)

(58) Field of Classification Search
USPC ........................................................ 320/107
See application file for complete search history.

(56) References Cited

U.S. PATENT DOCUMENTS 10,079,541 B1 * 9/2018 Taban ............... H02M 3/33546
2018/0003522 A1 * 1/2018 Ionescu ................. G01D 5/145
2018/0083617 A1 * 3/2018 Wang ..................... H02P 27/08

FOREIGN PATENT DOCUMENTS

CN 101106335 A 1/2008
CN 105874679 A 8/2016
(Continued)

OTHER PUBLICATIONS

Machine Translation of CN107276190A (Year: 2017).*
(Continued)

*Primary Examiner* — Samuel Berhanu
(74) *Attorney, Agent, or Firm* — Wenye Tan

(57) ABSTRACT

A charging device includes a first DC convertor and controller. The first DC convertor is configured to convert a DC signal outputted by a power battery to a DC signal required for a storage battery. The first DC convertor includes a first half-bridge logical link control (LLC) circuit and a second half-bridge LLC circuit arranged in parallel. The controller is connected with the first half-bridge LLC circuit and the second half-bridge LLC circuit and configured to acquire a total output current of the first DC convertor, and control the first half-bridge LLC circuit and the second half-bridge LLC circuit to operate alternately when the total output current is less than a current threshold.

12 Claims, 3 Drawing Sheets

(51) Int. Cl.

| | |
|---|---|
| ***H02J 7/90*** | (2026.01) |
| ***H02M 1/12*** | (2006.01) |
| ***H02M 1/42*** | (2007.01) |
| ***H02M 3/335*** | (2006.01) |

(52) U.S. Cl.

CPC ..... *H02M 3/33584* (2013.01); *B60L 2210/10* (2013.01); *H02J 2207/20* (2020.01)

(56) References Cited

FOREIGN PATENT DOCUMENTS

| | | | |
|---|---|---|---|
| CN | 106787653 | A | 5/2017 |
| CN | 107276190 | A | 10/2017 |
| CN | 107623365 | A | 1/2018 |
| CN | 108683337 | A | 10/2018 |
| CN | 109510453 | A | 3/2019 |
| CN | 111313679 | A | 6/2020 |
| JP | 2018520635 | A | 7/2018 |
| JP | 2019525707 | A | 9/2019 |
| WO | 2013168491 | A1 | 11/2013 |

OTHER PUBLICATIONS

The World Intellectual Property Organization (Wipo) International Search Report for PCT/CN2021/117465 Nov. 29, 2021 6 Pages.

* cited by examiner

CHARGING DEVICE, METHOD FOR CONTROLLING CHARGING OF CHARGING DEVICE, AND VEHICLE

CROSS-REFERENCE TO RELATED APPLICATIONS

The present application is a continuation application of PCT application No. PCT/CN2021/117465 filed on Sep. 9, 2021, which claims priority to Chinese Patent Application No. 202011091549.8 filed on Oct. 13, 2020. The entire content of all of the above-referenced applications is incorporated herein by reference.

FIELD

The present disclosure relates to the field of vehicle technologies, and more specifically, to a charging device, a method for controlling charging of a charging device, and a vehicle.

BACKGROUND

As vehicle commercialization progresses, a direct current-direct current (DC-DC) converter and an on-board charger (OBC) become vital components of vehicles.

In response to an increasing charging demand and a demand for an increasingly short charging time, a high-power charging device is produced. In some high-power charging devices, the DC-DC converter includes two half-bridge logical link control (LLC) resonant circuits with a parallel output voltage of 13.8 V, to supply power to a storage battery and a low-voltage appliance.

However, since an operating power range of the DC-DC converter varies between 0 W and 2500 W, a switch device thereof is always in a high frequency operating state, which causes high switching losses and affects the efficiency.

SUMMARY

The present disclosure is intended to resolve at least one of technical problems existing in the related art. One object of the present disclosure is to provide a charging device. Another objective of the present disclosure is to provide a vehicle. Another objective of the present disclosure is to provide a method for controlling charging of a charging device.

A first aspect of the present disclosure provides a charging device. The charging device includes: a first DC convertor, configured to convert a DC signal outputted by a power battery to a DC signal required for a storage battery, where the first DC convertor includes a first half-bridge logical link control (LLC) circuit and a second half-bridge LLC circuit arranged in parallel; and a controller, connected with the first half-bridge LLC circuit and the second half-bridge LLC circuit and configured to acquire a total output current of the first DC convertor, and control the first half-bridge LLC circuit and the second half-bridge LLC circuit to operate alternately when the total output current is less than a current threshold.

A second aspect of the present disclosure provides a vehicle. The vehicle includes: a storage battery, a power battery, and the charging device according to the foregoing embodiment, where the charging device is respectively connected with the storage battery and the power battery.

The vehicle according to the embodiment of the present disclosure uses the charging device mentioned in the above embodiment to charge the vehicle, and control the two half-bridge LLC circuits to operate alternately.

A third aspect of the present disclosure provides a method for controlling charging of a charging device. The charging device includes a first DC convertor configured to convert a DC signal outputted by a power battery to a DC signal required for a storage battery; the first DC convertor includes a first half-bridge LLC circuit and a second half-bridge LLC circuit arranged in parallel; and the method includes: acquiring a total output current of the first DC convertor; determining whether the total output current is less than a current threshold; and controlling the first half-bridge LLC circuit and the second half-bridge LLC circuit to operate alternately when the total output current is less than the current threshold.

According to the method for controlling charging of a charging device in the embodiment of the present disclosure, the first half-bridge LLC circuit and said second half-bridge LLC circuit are controlled to operate alternatively based on the magnitude of the total output current and the current threshold. That is to say, the two half-bridge LLC circuits do not operate at the same time.

The additional aspects and advantages of the present disclosure will be provided in the following description, some of which will become apparent from the following description or may be learned from practices of the present disclosure.

BRIEF DESCRIPTION OF THE DRAWINGS

FIG. 4 is a flowchart of a method for controlling charging of a charging device according to an embodiment of the present disclosure.

DETAILED DESCRIPTION

The embodiments of the present invention are described in detail below, and the embodiments described with reference to accompanying drawings are exemplary.

The charging device in an embodiment of the present disclosure is illustrated below with reference to FIG. 1.

Figure 1:
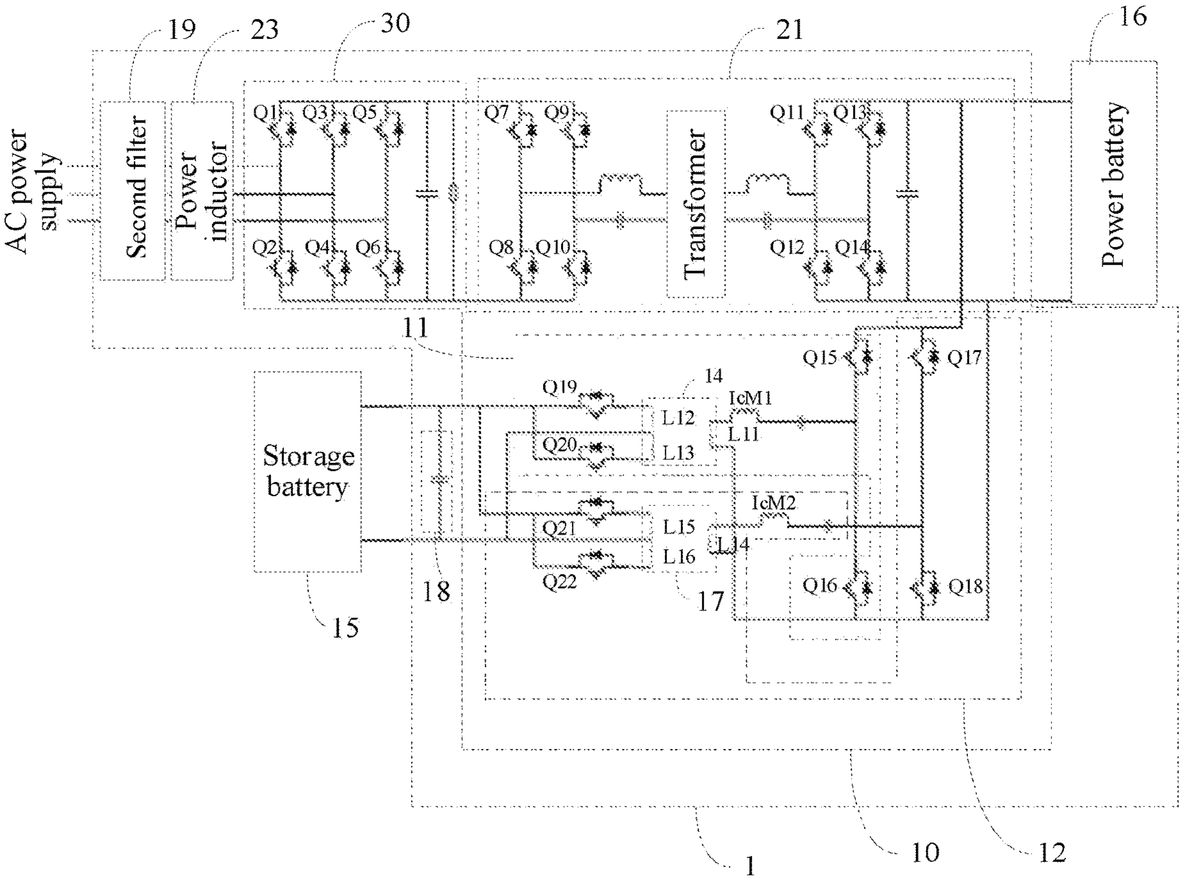
FIG. 1 is a schematic diagram of a circuit of a charging device according to an embodiment of the present disclosure.

FIG. 1 is a schematic diagram of a charging device and connections thereof according to an embodiment of the present disclosure. As shown in FIG. 1, a charging device 1 in one embodiment of the present disclosure includes a second filter 19, a power factor correction (PFC) circuit 30, and a second DC convertor 21. A first terminal of the second filter 19 is connected with an AC power supply. The PFC circuit 30 is configured to perform a PFC on an input AC and output a DC signal after the PFC. The PFC circuit 30 includes at least three-phase bridge arms. Each phase bridge arm is connected with a second terminal of the second filter 19 through a power inductor 23. An input terminal of the second DC convertor 21 is connected with an output terminal of the PFC circuit 30. An output terminal of the second DC convertor 21 is connected with a power battery 16. The charging device can reduce the switching loss and improve the charging efficiency.

In an embodiment, when the charging device 1 is charging a vehicle, the AC power supply enters the second filter 19, the second filter 19 filters the inputted AC power supply to filter out an excessive interference signal in the AC power supply, and the AC power supply after the filtering enters the PFC circuit 30. The PFC circuit 30 includes switching transistors Q1-Q6. The PFC circuit 30 is configured to perform a PFC on the AC and output a DC signal. The DC signal enters the second DC convertor 21. The second DC convertor 21 includes devices such as switching transistors Q7-Q14 and a transformer. Based on the second DC convertor 21, the DC signal is obtained, and DC conversion is performed on the DC signal, so as to provide a required DC signal for charging a storage battery.

Figure 2:
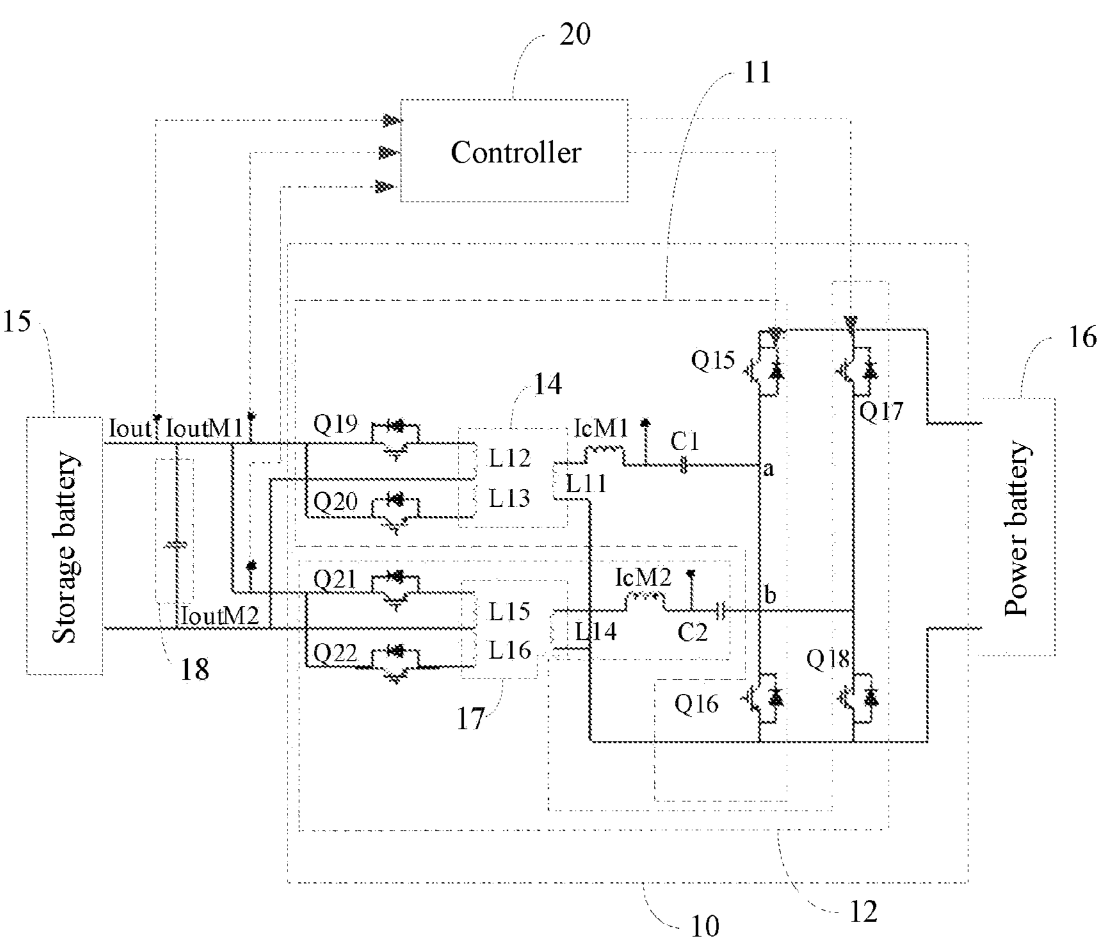
FIG. 2 is a schematic diagram of a circuit of a charging device according to an embodiment of the present disclosure.

As shown in FIG. 1 and FIG. 2, the charging device 1 in one embodiment of the present disclosure further includes a first DC convertor 10 and a controller 20. The first DC convertor 10 is configured to convert a DC signal outputted by the power battery 16 to a DC signal required for a storage battery 15.

Specifically, the DC signal charges the power battery 16 after DC conversion by the second DC convertor 21. During charging of the storage battery, the power battery 16 outputs the DC signal. The first DC convertor 10 converts the DC signal outputted by the power battery 16 to the DC signal required for the storage battery, to realize the charging of the storage battery 15.

In one embodiment of the present disclosure, the first DC convertor 10 includes a first half-bridge logical link control (LLC) circuit 11 and a second half-bridge LLC circuit 12 arranged in parallel. The controller 20 is connected with the first half-bridge LLC circuit 11 and the second half-bridge LLC circuit 12. The controller 20 is configured to acquire a total output current of the first DC convertor 10 and control the first half-bridge LLC circuit 11 and the second half-bridge LLC circuit 12 to operate alternately when the total output current is less than a current threshold. That is to say, the controller 20 causes the two half-bridge LLC circuits to operate alternately by monitoring the total output current based on the acquired total output current. That is to say, the two half-bridge LLC circuits do not operate at the same time, which can avoid the switch of whole half-bridge LLC circuit from always operating at high frequency, reduce the loss of the switching devices in the circuit, and improve the charging efficiency.

In an embodiment, as shown in FIG. 2, for example, an output current of the first half-bridge LLC circuit 11 is denoted as IoutM1, an output current of the second half-bridge LLC circuit 12 is denoted as IoutM2, the total output current of the first DC convertor 10 is denoted as Iout, a real-time temperature of the first half-bridge LLC circuit is denoted as T1, and a real-time temperature of the second half-bridge LLC circuit 12 is denoted as T2. The controller 20 controls operating states of the two half-bridge LLC circuits based on the total output current Iout. That is, during the charging of the storage battery 15, the first half-bridge LLC circuit preferentially operates by default, and the total output current Iout is detected in real time. The controller 20 pre-stores a current threshold therein. When the total output current Iout is less than the current threshold, for example, Iout<Imax/2, the controller 20 controls the first half-bridge LLC circuit 11 and the second half-bridge LLC circuit 12 to operate alternately. During detection of the total output current of the two half-bridge LLC circuits, the impact of a temperature on the two half-bridge LLC circuits needs to be considered. By switching the first half-bridge LLC circuit 11 and the second half-bridge LLC circuit 12 to operate alternately, switching devices of the two half-bridge LLC circuits are prevented from always being in a high frequency operating state, so that the temperatures of the two half-bridge LLC circuits are kept equilibrated, which reduces the loss of the switching devices in a switching unit and improves the charging efficiency.

According to the charging device 1 in one embodiment of the present disclosure, the first half-bridge LLC circuit 11 and the second half-bridge LLC circuit 12 connected in parallel are arranged in the first DC convertor 10. The controller 20 controls the operating states of the two half-bridge LLC circuits based on the total output current of the first DC convertor 10. When the total output current is less than the current threshold, the two half-bridge LLC circuits are controlled to operate alternately. That is to say, the two half-bridge LLC circuits operate at different times, which can prevent the whole half-bridge LLC circuits from always being in the high frequency operating state, reduce the loss of the switching devices in the circuit, achieve temperature equilibrium, and improve the charging efficiency.

In some embodiments, as shown in FIG. 2, the controller 20, when controlling the first half-bridge LLC circuit 11 and the second half-bridge LLC circuit 12 to operate alternately based on the total output current Iout, controls the operation of the first half-bridge LLC circuit 11 if the total output current Iout is detected to be less than the current threshold value Imax/2, and records a first operating time such as t1 of the first half-bridge LLC circuit 11. The first operating time t1 is compared with the time threshold such as S. When the first operating time t1 reaches the time threshold S, the second half-bridge LLC circuit 12 is switched to operate, and a second operating time of the second half-bridge LLC circuit 12 is recorded, such as t2. The second operating time t2 is compared with the time threshold such as S. When the second operating time t2 reaches the time threshold S, the first half-bridge LLC circuit is re-switched to operate. The two half-bridge LLC circuits can operate alternately by cyclically performing the control process. As a result, the temperature of the two half-bridge LLC circuits can maintain balance, avoid a temperature rise caused by a long-term operation of one half-bridge LLC circuit, and ensure the charging safety.

In some embodiments, since the total output current Iout is constantly changing, in order to ensure the charging efficiency, the total output current Iout is continuously detected. The total output current Iout is different in size, and the control on the two half-bridge LLC circuits is also different. For example, when the controller 20 detects that the total output current Iout is greater than or equal to the current threshold Imax/2, the first half-bridge LLC circuit 11 and the second half-bridge LLC circuit 12 are controlled to operate simultaneously. That is, the two half-bridge LLC circuits are controlled to operate simultaneously, and the operating state of the two half-bridge LLC circuits is controlled to ensure the charging effect by comparing the magnitude of the total output current Iout with the current threshold Imax/2.

In some embodiments, when the total output current Iout is greater than or equal to the current threshold Imax/2, that is, when the output current is large, the controller 20 controls the first half-bridge LLC circuit 11 and the second half-bridge LLC circuit 12 to operate simultaneously, sets switching transistor frequencies of the first half-bridge LLC circuit 11 and the second half-bridge LLC circuit 12, such as F, and is configured to interleave the switching transistor of the first half-bridge LLC circuit 11 and the switching transistor of the second half-bridge LLC circuit 12 at a preset phase angle difference. For example, the switching transistor of the first half-bridge LLC circuit 11 and the switching transistor of the second half-bridge LLC circuit 12 operate alternately by 90° to reduce an output ripple current.

In some embodiments, as shown in FIG. 1 and FIG. 2, the first half-bridge LLC circuit 11 includes a first switching transistor Q15, a second switching transistor Q16, a first capacitor C1, a first inductor IcM1, a first transformer 14, a third switching transistor Q19, and a fourth switching transistor Q20. A first terminal of the first switching transistor Q15 is connected with a first terminal of the power battery 16. A second terminal of the first switching transistor Q15 is connected with a first terminal of the second switching transistor Q16. A control terminal of the first switching transistor Q15 is connected with the controller 20. A second terminal of the second switching transistor Q16 is connected with a second terminal of the power battery 16. A control terminal of the second switching transistor Q16 is connected with the controller 20. A first node a is arranged between the second terminal of the first switching transistor Q15 and the first terminal of the second switching transistor Q16. The first half-bridge LLC circuit includes a first capacitor C1 and a first inductor IcM1. A first terminal of the first capacitor C1 is connected with the first node a; and a second terminal of the first capacitor C1 is connected with a first terminal of the first inductor IcM1. The first transformer 14 includes a first primary coil L11, a first secondary coil L12, and a second secondary coil L13. A first terminal of the first primary coil L11 is connected with a second terminal of the first inductor IcM1. A second terminal of the first primary coil L11 is connected with a second terminal of the second switching transistor Q16. A second terminal of the first secondary coil L12 is connected with a first terminal of the second secondary coil L13 as a first common terminal; and the first common terminal is connected with a second terminal of the storage battery 15; and the first half-bridge LLC circuit includes a third switching transistor Q19 and a fourth switching transistor Q20. A first terminal of the third switching transistor Q19 is connected with a first terminal of the first secondary coil L12; a second terminal of the third switching transistor Q19 is connected with a first terminal of the storage battery 15; a control terminal of the third switching transistor Q19 is connected with the controller 20; a first terminal of the fourth switching transistor Q20 is connected with a second terminal of the second secondary coil L13; a second terminal of the fourth switching transistor Q20 is connected with a second terminal of the third switching transistor Q19 and a first terminal of the storage battery 15; and a control terminal of the fourth switching transistor Q20 is connected with the controller 20. The controller 20 controls the switching state of each switching transistor according to the magnitude of the total output current Iout of the first DC convertor 10, so that the first half-bridge LLC circuit 11 and the second half-bridge LLC circuit 12 operate alternately. Thereby, the first half-bridge LLC circuit 11 can avoid having each of the switching transistors always in operation when operating in different power ranges, and reduce the loss of the switching transistor in the first half-bridge LLC circuit 11.

In some embodiments, as shown in FIG. 2, the second half-bridge LLC circuit 12 includes a fifth switching transistor Q17, a sixth switching transistor Q18, a second capacitor C2, a second inductor IcM2, a second transformer 17, a seventh switching transistor Q21, and an eighth switching transistor Q22. A first terminal of the fifth switching transistor Q17 is connected with a first terminal of the power battery 16. A second terminal of the fifth switching transistor Q17 is connected with a first terminal of the sixth switching transistor Q18. A control terminal of the fifth switching transistor Q17 is connected with the controller 20. A second terminal of the sixth switching transistor Q18 is connected with a second terminal of the power battery 16. A control terminal of the sixth switching transistor Q18 is connected with the controller 20. A second node b is arranged between the second terminal of the fifth switching transistor Q17 and the first terminal of the sixth switching transistor Q18. A first terminal of the second capacitor C2 is connected with the second node b. A second terminal of the second capacitor C2 is connected with a first terminal of the second inductor IcM2. The second transformer 17 includes a second primary coil L14, a third secondary coil L15, and a fourth secondary coil L16. A first terminal of the second primary coil L14 is connected with a second terminal of the second inductor IcM2. A second terminal of the second primary coil L14 is respectively connected with the second terminal of the first transformer 14, the second terminal of the second switching transistor Q16, and the second terminal of the sixth switching transistor Q18. A second terminal of the third secondary coil L15 is connected with a first terminal of the fourth secondary coil L16 as a second common terminal. The second common terminal is connected with a second terminal of the storage battery 15. A first terminal of the seventh switching transistor Q21 is connected with a first terminal of the third secondary coil L15. A second terminal of the seventh switching transistor Q21 is connected with a first terminal of the storage battery 15. A control terminal of the seventh switching transistor Q21 is connected with the controller 20. A first terminal of the eighth switching transistor Q22 is connected with a second terminal of the fourth secondary coil L16. A second terminal of the eighth switching transistor Q22 is connected with a second terminal of the seventh switching transistor Q21 and a first terminal of the storage battery 15. A control terminal of the eighth switching transistor Q22 is connected with the controller 20. The controller 20 controls the operating state of a master conversion unit M1 and a slave conversion unit M2 according to the magnitude of the current value of the total output current Iout received, so that a switching state of each switching transistor is controlled and the first half-bridge LLC circuit 11 and the second half-bridge LLC circuit 12 operate alternately. Thereby, the second half-bridge LLC circuit 12 can avoid having each of the switching transistors in operation when operating in different power ranges, and reduce the loss of the switching transistor in the second half-bridge LLC circuit 12.

In some embodiments, as shown in FIG. 2, the first DC convertor 10 further includes a first filter 18. A first terminal of the first filter 18 is connected with a first terminal of the storage battery 15, and a second terminal of the first filter 18 is connected with a second terminal of the storage battery 15. When charging device 1 charges, the DC signal required by the storage battery is filtered by the first filter 18 to filter out an excess interference signal and improve the charging efficiency.

Based on the above, according to the charging device 1 in the embodiment of the present disclosure, the first half-bridge LLC circuit 11 and the second half-bridge LLC circuit 12 connected in parallel are arranged, and the controller 20 controls the operating state of the two half-bridge LLC circuits based on the total output current of the first DC convertor 10. When the total output current is less than the current threshold, the two half-bridge LLC circuits are controlled to operate alternately. That is to say, the two half-bridge LLC circuits do not operate at the same time, which can avoid the whole half-bridge LLC circuit from always operating at high frequency, reduce the loss of the switching devices in the circuit, and improve the charging efficiency.

A vehicle in an embodiment of a second aspect of the present disclosure is described below with reference to the accompanying drawings.

Figure 3:
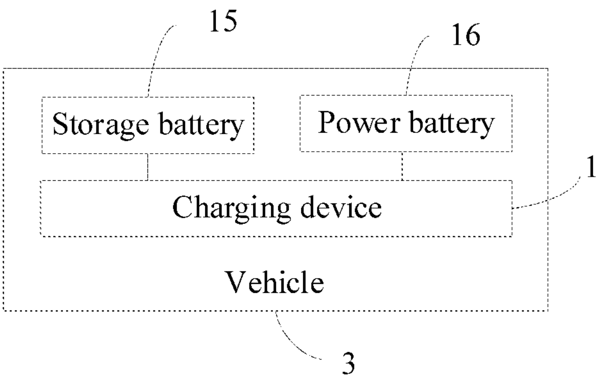
FIG. 3 is a block diagram of a vehicle according to an embodiment of the present disclosure.

FIG. 3 is a block diagram of a vehicle according to an embodiment of the present disclosure. As shown in FIG. 3, the vehicle 3 according to the embodiment of the present disclosure includes a storage battery 15, a power battery 16, and a charging device 1 mentioned in the above embodiment. The charging device 1 is respectively connected with the storage battery 15 and the power battery 16.

The vehicle 3 according to the embodiment of the present disclosure uses the charging device 1 mentioned in the above embodiment to charge the vehicle 3, and control the two half-bridge LLC circuits to operate alternately. That is to say, the two half-bridge LLC circuits do not operate at the same time, which can avoid the whole half-bridge LLC circuit from always operating at high frequency, reduce the loss of the switching devices in the circuit, and improve the charging efficiency.

The method for controlling charging of a charging device is described based on the charging device mentioned in the above embodiment. The charging device includes a first DC convertor configured to convert a DC signal outputted by a power battery to a DC signal required for a storage battery. The first DC convertor includes a first half-bridge LLC circuit and a second half-bridge LLC circuit arranged in parallel. By controlling the operating state of the two half-bridge LLC circuits, the damage to the switching devices in the circuit is reduced and the influence on the efficiency is reduced.

The method for controlling charging of a charging device according to an embodiment of a third aspect of the present disclosure is described below with reference to the accompanying drawings.

FIG. 4 is a flowchart of a method for controlling charging of a charging device according to an embodiment of the present disclosure. As shown in FIG. 4, the method of controlling charging of a charging device in one embodiment of the present disclosure includes at least step S1, step S2, and step S3.

Step S1: A total output current of the first DC convertor is acquired.

In the embodiment, when the charging device charges the vehicle, the magnitude of the total output current is related to the operating state of the two half-bridge LLC circuits. The power battery outputs the DC signal. The DC signal is passed through the first DC convertor, the first DC convertor converts the DC signal, and the controller acquires the total output current of the DC convertor.

Step S2: Whether the total output current is less than a current threshold is determined.

In the embodiment, a current threshold Imax/2 is prestored in the controller. The controller continuously detects the total output current Iout of the DC convertor and compares the total output current Iout with the current threshold Imax/2 to determine the magnitude between the two current values.

Step S3: The first half-bridge LLC circuit and the second half-bridge LLC circuit are controlled to operate alternately when the total output current is less than the current threshold.

In the embodiment, the magnitude of the total output current Iout and the current threshold Imax/2 determines the operating state of the first half-bridge LLC circuit and the second half-bridge LLC. When the total output current Iout is less than the current threshold Imax/2, the controller controls the two half-bridge LLC circuits to operate alternately, which can avoid the two half-bridge LLC circuits to always operate at high frequency and reduce the loss of switching devices in the circuit.

According to the method for controlling charging of a charging device in the embodiment of the present disclosure, the first half-bridge LLC circuit and said second half-bridge LLC circuit are controlled to operate alternatively based on the magnitude of the total output current and the current threshold. That is to say, the two half-bridge LLC circuits do not operate at the same time, which can avoid the whole half-bridge LLC circuit from always operating at high frequency, reduce the loss of the switching devices in the circuit, and improve the charging efficiency.

In some embodiments, the controller controls the first half-bridge LLC circuit and the second half-bridge LLC circuit to operate alternately in cycles when the total output current Iout is less than the current threshold Imax/2. When the controller detects that the total output current Iout is less than the current threshold Imax/2, the first half-bridge LLC circuit is controlled to operate and the first operating time t1 of the first half-bridge LLC circuit is recorded. The first operating time t1 is compared with the time threshold S. When the first operating time t1 reaches the time threshold S, the second half-bridge LLC circuit is switched to operate, and a second operating time t2 of the second half-bridge LLC circuit is recorded. The second operating time t2 is compared with the time threshold S. When the second operating time t2 reaches the time threshold S, the first half-bridge LLC circuit is re-switched to operate. The two half-bridge LLC circuits can operate alternately by cyclically performing the control process. As a result, the temperature of the two half-bridge LLC circuits can maintain balance, avoid a temperature rise caused by a long-term operation of one half-bridge LLC circuit, and ensure the charging safety.

In some embodiments, when the total output current Iout is greater than or equal to the current threshold Imax/2, the first half-bridge LLC circuit and the second half-bridge LLC circuit are controlled to operate simultaneously. By comparing the total output current Iout with the current threshold of Imax/2, the operating state of the two half-bridge LLC circuits is controlled, and the charging effect is better.

In some embodiments, when the output current is large, the controller controls the first half-bridge LLC circuit and the second half-bridge LLC circuit to operate, and sets switching transistor frequencies of the first half-bridge LLC circuit and the second half-bridge LLC circuit, such as F. At the same time, the switching transistor of the first half-bridge LLC circuit and the switching transistor of the second half-bridge LLC circuit are staggered 90° apart to achieve a purpose of reducing an output ripple current.

The method for controlling charging of a charging device according to an embodiment of the present disclosure is described below in conjunction with FIG. 5.

Figure 5:
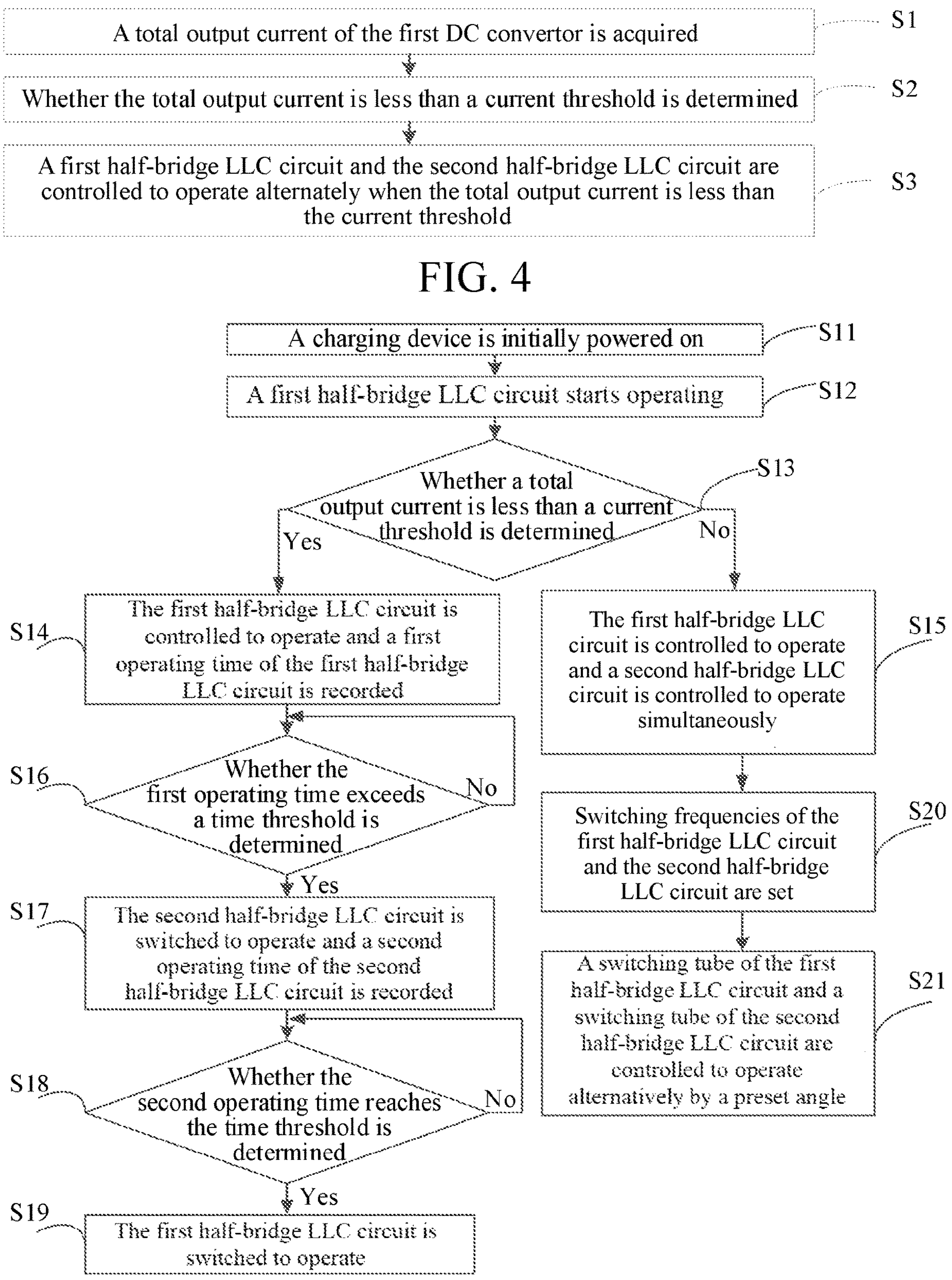
FIG. 5 is a flowchart of a method for controlling charging of a charging device according to an embodiment of the present disclosure.

As shown in FIG. 5, FIG. 5 is a flowchart of a method for controlling charging of a charging device according to an embodiment of the present disclosure.

Step S11: The charging device is initially powered on.

Step S12: A first half-bridge LLC circuit starts operating.

Step S13: Whether a total output current is less than a current threshold is determined. If so, step S14 is performed, and if not, step S15 is performed.

Step S14: The first half-bridge LLC circuit is controlled to operate and a first operating time of the first half-bridge LLC circuit is recorded.

Step S15: The first half-bridge LLC circuit is controlled to operate and a second half-bridge LLC circuit is controlled to operate simultaneously.

Step S16: Whether the first operating time exceeds the time threshold is determined. If so, step S17 is performed, and if not, step S16 is still performed.

Step S17: The second half-bridge LLC circuit is switched to operate and a second operating time of the second half-bridge LLC circuit is recorded.

Step S18: Whether the second operating time reaches the time threshold is determined. If so, step S19 is performed, and if not, step S18 is still performed.

Step S19: The first half-bridge LLC circuit is switched to operate.

step S20: Switching frequencies of the first half-bridge LLC circuit and the second half-bridge LLC circuit are set.

step S21: A switching transistor of the first half-bridge LLC circuit and a switching transistor of the second half-bridge LLC circuit are controlled to operate alternatively by a preset angle.

Based on the above, according to the method for controlling charging of a charging device in the embodiment of the present disclosure, the first half-bridge LLC circuit and said second half-bridge LLC circuit are controlled to operate alternatively based on the magnitude of the total output current and the current threshold. That is to say, the two half-bridge LLC circuits do not operate at the same time, which can avoid the whole half-bridge LLC circuit from always operating at high frequency, reduce the loss of the switching devices in the circuit, and improve the charging efficiency.

In the description of this specification, the description of the reference terms such as “an embodiment”, “some embodiments”, “exemplary embodiments”, “example”, “specific example”, or “some examples” means that the specific features, structures, materials or characteristics described with reference to the embodiment or example are included in at least one embodiment or example of the present disclosure. In this specification, exemplary descriptions of the foregoing terms do not necessarily refer to the same embodiment or example.

Although the embodiments of the present disclosure have been shown and described, a person of ordinary skill in the art should understand that various changes, modifications, replacements and variations may be made to the embodiments without departing from the principles and spirit of the present disclosure, and the scope of the present disclosure is as defined by the appended claims and their equivalents.

What is claimed is:

1. A charging device, comprising:

a first DC convertor, configured to convert a DC signal outputted by a power battery to a DC signal required for a storage battery, wherein the first DC convertor comprises a first half-bridge logical link control (LLC) circuit and a second half-bridge LLC circuit arranged in parallel;

a controller, connected with the first half-bridge LLC circuit and the second half-bridge LLC circuit and configured to acquire a total output current of the first DC convertor, and control the first half-bridge LLC circuit and the second half-bridge LLC circuit to operate alternately when the total output current is less than a current threshold;

a second filter, wherein a first terminal of the second filter is connected with an AC power supply;

a power factor correction (PFC) circuit, configured to perform a PFC on an input AC and output a DC signal after the PFC, wherein the PFC circuit comprises at least three-phase bridge arms; and each phase bridge arm is connected with a second terminal of the second filter through a power inductor; and a second DC convertor, wherein an input terminal of the second DC convertor is connected with an output terminal of the PFC circuit; and an output terminal of the second DC convertor is connected with the power battery.

2. The charging device according to claim 1, wherein the controller is configured to cyclically perform the following process when the first half-bridge LLC circuit and the second half-bridge LLC circuit operate alternately: controlling the first half-bridge LLC circuit to operate, recording a first operating time of the first half-bridge LLC circuit, switching the second half-bridge LLC circuit to operate when the first operating time reaches a time threshold, recording a second operating time of the second half-bridge LLC circuit, and switching the first half-bridge LLC circuit to operate when the second operating time reaches the time threshold.

3. The charging device according to claim 1, wherein the controller is further configured to control the first half-bridge LLC circuit and the second half-bridge LLC circuit to operate simultaneously when the total output current is greater than or equal to the current threshold.

4. The charging device according to claim 1, wherein the controller is configured to control a switching transistor of the first half-bridge LLC circuit and a switching transistor of the second half-bridge LLC circuit alternatively at a preset phase angle difference during control of the first half-bridge LLC circuit and the second half-bridge LLC circuit to operate simultaneously.

5. A charging device, comprising:

a first DC convertor, configured to convert a DC signal outputted by a power battery to a DC signal required for a storage battery, wherein the first DC convertor comprises a first half-bridge logical link control (LLC) circuit and a second half-bridge LLC circuit arranged in parallel; and a controller, connected with the first half-bridge LLC circuit and the second half-bridge LLC circuit and configured to acquire a total output current of the first DC convertor, and control the first half-bridge LLC circuit and the second half-bridge LLC circuit to operate alternately when the total output current is less than a current threshold, wherein the first half-bridge LLC circuit comprises:

a first switching transistor and a second switching transistor, wherein a first terminal of the first switching transistor is connected with a first terminal of the power battery; a second terminal of the first switching transistor is connected with a first terminal of the second switching transistor; a control terminal of the first switching transistor is connected with the controller; a second terminal of the second switching transistor is connected with a second terminal of the power battery; a control terminal of the second switching transistor is connected with the controller; and a first node is arranged between the second terminal of the first switching transistor and the first terminal of the second switching transistor;

a first capacitor and a first inductor, wherein a first terminal of the first capacitor is connected with the first node; and a second terminal of the first capacitor is connected with a first terminal of the first inductor;

a first transformer, wherein the first transformer comprises a first primary coil, a first secondary coil, and a second secondary coil; a first terminal of the first primary coil is connected with a second terminal of the first inductor; a second terminal of the first primary coil is connected with a second terminal of the second switching transistor; a second terminal of the first secondary coil and a first terminal of the second secondary coil are connected as a first common terminal; and the first common terminal is connected with a second terminal of the storage battery; and a third switching transistor and a fourth switching transistor, wherein a first terminal of the third switching transistor is connected with a first terminal of the first secondary coil; a second terminal of the third switching transistor is connected with a first terminal of the storage battery; a control terminal of the third switching transistor is connected with the controller; a first terminal of the fourth switching transistor is connected with a second terminal of the second secondary coil; a second terminal of the fourth switching transistor is connected with the second terminal of the third switching transistor and the first terminal of the storage battery; and a control terminal of the fourth switching transistor is connected with the controller.

6. The charging device according to claim 5, wherein the second half-bridge LLC circuit comprises:

a fifth switching transistor and a sixth switching transistor, wherein a first terminal of the fifth switching transistor is connected with the first terminal of the power battery; a second terminal of the fifth switching transistor is connected with a first terminal of the sixth switching transistor; a control terminal of the fifth switching transistor is connected with the controller; a second terminal of the sixth switching transistor is connected with the second terminal of the power battery; a control terminal of the sixth switching transistor is connected with the controller; and a second node is arranged between the second terminal of the fifth switching transistor and the first terminal of the sixth switching transistor;

a second capacitor and a second inductor, wherein a first terminal of the second capacitor is connected with the second node; and a second terminal of the second capacitor is connected with a first terminal of the second inductor;

a second transformer, wherein the second transformer comprises a second primary coil, a third secondary coil, and a fourth secondary coil; a first terminal of the second primary coil is connected with a second terminal of the second inductor; a second terminal of the second primary coil is connected with a second terminal of the first transformer, the second terminal of the second switching transistor, and the second terminal of the sixth switching transistor; a second terminal of the third secondary coil and a first terminal of the fourth secondary coil are connected as a second common terminal; and the second common terminal is connected with the second terminal of the storage battery; and a seventh switching transistor and an eighth switching transistor, wherein a first terminal of the seventh switching transistor is connected with a first terminal of the third secondary coil; a second terminal of the seventh switching transistor is connected with the first terminal of the storage battery; a control terminal of the seventh switching transistor is connected with the controller; a first terminal of the eighth switching transistor is connected with a second terminal of the fourth secondary coil; a second terminal of the eighth switching transistor is connected with a second terminal of the seventh switching transistor and the first terminal of the storage battery; and a control terminal of the eighth switching transistor is connected with the controller.

7. The charging device according to claim 1, wherein the first DC convertor further comprises a first filter; a first terminal of the first filter is connected with a first terminal of the storage battery; and a second terminal of the first filter is connected with a second terminal of the storage battery.

8. A vehicle having the charging device according to claim 1, further comprising:

the storage battery and the power battery, wherein the charging device is connected with the storage battery and the power battery.

9. A method for controlling charging of a charging device, the charging device having a first DC convertor comprising a first half-bridge LLC circuit and a second half-bridge LLC circuit arranged in parallel, and configured to convert a DC signal outputted by a power battery to a DC signal required for a storage battery, a second filter, wherein a first terminal of the second filter is connected with an AC power supply, a power factor correction (PFC) circuit, configured to perform a PFC on an input AC and output a DC signal after the PFC, wherein the PFC circuit comprises at least three-phase bridge arms; and each phase bridge arm is connected with a second terminal of the second filter through a power inductor; and a second DC convertor, wherein an input terminal of the second DC convertor is connected with an output terminal of the PFC circuit; and an output terminal of the second DC convertor is connected with the power battery, the method comprising:

acquiring a total output current of the first DC convertor;

determining whether the total output current is less than a current threshold; and controlling the first half-bridge LLC circuit and the second half-bridge LLC circuit to operate alternately when the total output current is less than the current threshold.

10. The method according to claim 9, wherein the controlling the first half-bridge LLC circuit and the second half-bridge LLC circuit to operate alternately includes:

cyclically performing: controlling the first half-bridge LLC circuit to operate, recording a first operating time of the first half-bridge LLC circuit, switching the second half-bridge LLC circuit to operate when the first operating time reaches a time threshold, recording a second operating time of the second half-bridge LLC circuit, and switching the first half-bridge LLC circuit to operate when the second operating time reaches the time threshold.

11. The method according to claim 9, further comprising:

controlling the first half-bridge LLC circuit and the second half-bridge LLC circuit to operate simultaneously when the total output current is greater than or equal to the current threshold.

12. The method according to claim 11, wherein the controlling the first half-bridge LLC circuit and the second half-bridge LLC circuit to operate simultaneously includes:

alternatively controlling a switching transistor of the first half-bridge LLC circuit and a switching transistor of the second half-bridge LLC circuit at a preset phase angle difference.

* * * * *